J. D. CAREY.
End-Gates for Wagons.

No. 139,766.  Patented June 10, 1873.

Witnesses
Henry W. Wells
James Thurlow

Jesse D. Carey.
by E. Thurlow
his Atty.

UNITED STATES PATENT OFFICE.

JESSE D. CAREY, OF MONICA, ILLINOIS.

IMPROVEMENT IN END-GATES FOR WAGONS.

Specification forming part of Letters Patent No. 139,766, dated June 10, 1873; application filed February 18, 1873.

*To all whom it may concern:*

Be it known that I, JESSE D. CAREY, of Monica, in the county of Peoria and State of Illinois, have invented an Improvement on my End-Gate for Wagons, patented, December 31, 1872, No. 134,358, to me by the United States, there fully described, said description being here referred to and made part hereof; and do hereby declare that the following is a full, clear, and exact description thereof, reference being had to the annexed drawings making a part of this specification, in which like letters of reference refer to like parts, and in which—

Figure 1:
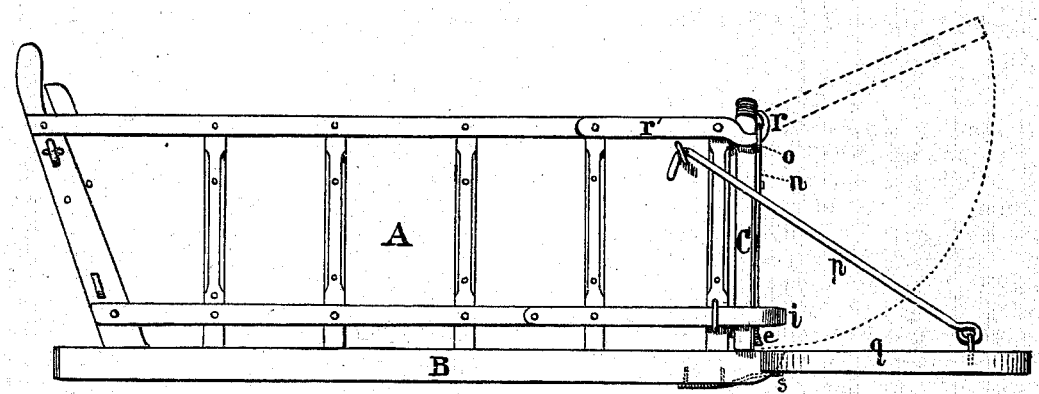
Figure 2:
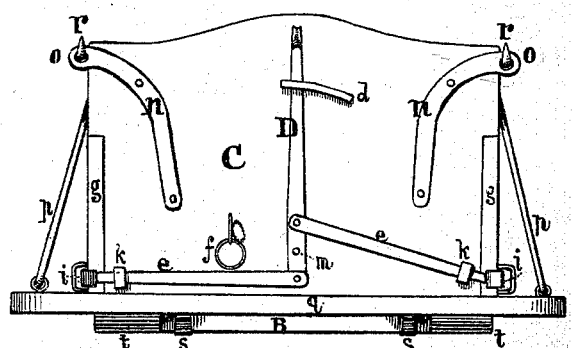
Figure 3:
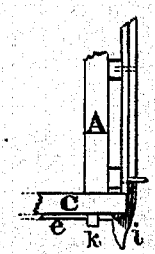
Figure 4:
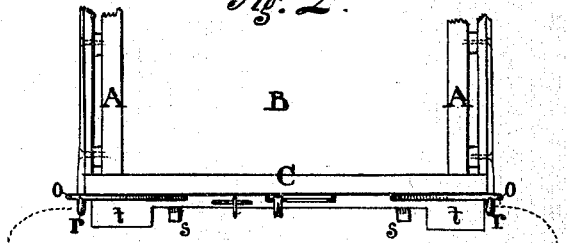

Figure 1 represents a longitudinal elevation of the cart or wagon to which the end-gate is attached; Fig. 2, a rear elevation of the end-gate and cart or wagon, with a shoveling-board, $q$, movably hooked thereto; Fig. 3, plan of end-gate catch or hook and its connections; Fig. 4, plan of rear end of cart or wagon, intended merely to show the mode of mounting and swinging it upon the hooks $r\ r$.

This is an improvement on my former patent end-gate, as above referred to, and designed to adapt said end-gate to carts as well as to wagons. The gate, as there described, was mounted and swung upon the usual cross-rod which connects the wagon-sides. The improvement consists in affixing a plate or strap of metal to the exterior face of the gate near each upper corner, each strap terminating beyond its respective corners in an eye which fits over and falls into the hollow of a hook, which points upward and forward, affixed to either side board, said eyes and hooks forming at once a hinge, and with the intermediate gate and its eyes a brace for the side boards. The gate, when closed, is retained by the spring-hooks on either side of the cart or wagon, which are disengaged by the lever and sliding connections or rods attached to the lever.

The cart or wagon can be dumped without removing the gate, which latter also acts as a brace for the sides.

A A represents the side boards of a cart or wagon. To each, at the upper rear corner, is attached a metal plate or strap, $r'$, terminating in a hook, $r$, which projects far enough beyond the end of board to receive one of the eyes, $o$, of the gate C, the hollow part of the hook being upward and the point curved upward and forward; B, the bed, which, in a wagon, may terminate in two projections, $t\ t$, and two supports, $s\ s$, to receive the edge of the shoveling-board $q$, which may be further horizontally supported by rods $p\ p$ hooked to either side board; C, the end-gate, which is of the same construction with that described in the aforesaid Letters Patent, which are hereby referred to for a full description, except as to the hanging thereof—*i. e.*, by means of the spring-hooks $i\ i$ at each side of the vehicle, and their respective adjoining sliding bolts or detaching-rods $k\ k$, operated by the lever D.

I will now describe the improvement by which the gate is made adaptable both to carts as well as wagons, viz: A metal plate or strap, $n\ n$, is bolted or screwed to the surface of the gate at each upper corner so as to project, with a terminal vertical eye, $o$, beyond the respective corners, where they are slipped over the hooks $r\ r$ at each side of the vehicle, the points of which are directed upward and forward so as to retain the eyes $o\ o$, and the gate, which thus depends from these points, forming a brace to keep the sides from spreading under pressure of a load, without the inconvenience and incumbrance of the usual horizontal brace-rod.

The operation of this improvement is as follows: This device is intended more particularly for carts or vehicles which can "dump" their loads, the usual brace-rod being obviated by constructing the gate so as to fill the place of the rod; at the same time the load can be dumped without removing the gate, as the latter will swing outward even as far as to a horizontal position, instantly relieving the vehicle of the load, and fall back to its fastenings immediately when the vehicle is "righted."

The gate can, by raising it to a horizontal position, be removed from the vehicle by unshipping the eyes o o from their respective hooks r r.

I do not claim a patent for the gate, but only for the improvement by which the gate can be adapted to carts as well as wagons.

What I claim as my improvement is—

The end-gate C having straps n n, with eyes o o to receive the hooks r r of the straps attached to the sides of the wagon-body, upon which the gate swings, substantially in the manner and for the purpose set forth.

In testimony that I claim the foregoing improvement in end-gate I have hereunto set my hand this 7th day of February, 1873.

JESSE D. CAREY.

Witnesses:
HENRY W. WELLS,
JAMES M. MORSE.